United States Patent
Lin et al.

(10) Patent No.: US 11,482,012 B2
(45) Date of Patent: Oct. 25, 2022

(54) METHOD FOR DRIVING ASSISTANCE AND MOBILE DEVICE USING THE METHOD

(71) Applicant: HON HAI PRECISION INDUSTRY CO., LTD., New Taipei (TW)

(72) Inventors: Jung-Yi Lin, New Taipei (TW); Chung-Yu Wu, New Taipei (TW); Tzu-Chen Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 309 days.

(21) Appl. No.: 16/823,532

(22) Filed: Mar. 19, 2020

(65) Prior Publication Data

US 2020/0320316 A1    Oct. 8, 2020

(30) Foreign Application Priority Data

Apr. 4, 2019 (CN) .......................... 201910273122.0

(51) Int. Cl.
| | |
|---|---|
| G06V 20/58 | (2022.01) |
| G06N 3/08 | (2006.01) |
| B60W 40/06 | (2012.01) |
| B60R 11/04 | (2006.01) |
| B60W 40/04 | (2006.01) |
| G06V 10/56 | (2022.01) |
| G06V 10/20 | (2022.01) |

(52) U.S. Cl.
CPC ............ *G06V 20/582* (2022.01); *B60R 11/04* (2013.01); *B60W 40/04* (2013.01); *B60W 40/06* (2013.01); *G06N 3/08* (2013.01); *G06V 10/255* (2022.01); *G06V 10/56* (2022.01)

(58) Field of Classification Search
None
See application file for complete search history.

(56) References Cited

U.S. PATENT DOCUMENTS

2019/0012551 A1* 1/2019 Fung ...................... G06V 10/56

FOREIGN PATENT DOCUMENTS

| CN | 1818929 | 8/2006 |
|---|---|---|
| CN | 103786726 | 5/2014 |
| CN | 107571867 | 1/2018 |
| CN | 109074078 | 12/2018 |

OTHER PUBLICATIONS

Chiung-Yao Fang, Sei-Wang Chen, Chiou-Shann Fuh, Road Sign Detection and Tracking from Complex Background in Sequential Video Images, Dec. 2000 (Year/Month), Department of Information and Computer Education National Taiwan Normal University Taipei, Taiwan, R. O. C.

* cited by examiner

*Primary Examiner* — Leon Flores
(74) *Attorney, Agent, or Firm* — ScienBiziP, P.C.

(57) ABSTRACT

A method for assisting a driver to drive a vehicle in a safer manner includes capturing images of road in front of the vehicle, and identifying a traffic sign in the images. A first image frame is captured at a first time and a second image frame is captured at a later second time when the images do comprise the traffic sign. A change in size or other apparent change of the traffic sign from the first image frame to the second image frame is determined, and conformity or non-conformity with a predetermined rule is then determined. The traffic sign can be analyzed and recognized to trigger the vehicle to perform an action accordingly when conformity is found. A device providing assistance with driving is also provided.

18 Claims, 4 Drawing Sheets

METHOD FOR DRIVING ASSISTANCE AND MOBILE DEVICE USING THE METHOD

FIELD

The subject matter herein generally relates to road traffic safety.

BACKGROUND

Devices providing assistance in driving usually analyze location of a driving positioning system to assist a driver to drive the vehicle. When a signal strength is weak or a signal quality is poor, accuracy of the driving assistance device may be lost.

Thus, there is a room for improvement.

BRIEF DESCRIPTION OF THE DRAWINGS

Implementations of the present disclosure will now be described, by way of embodiments, with reference to the attached figures.

DETAILED DESCRIPTION

Figure 1:
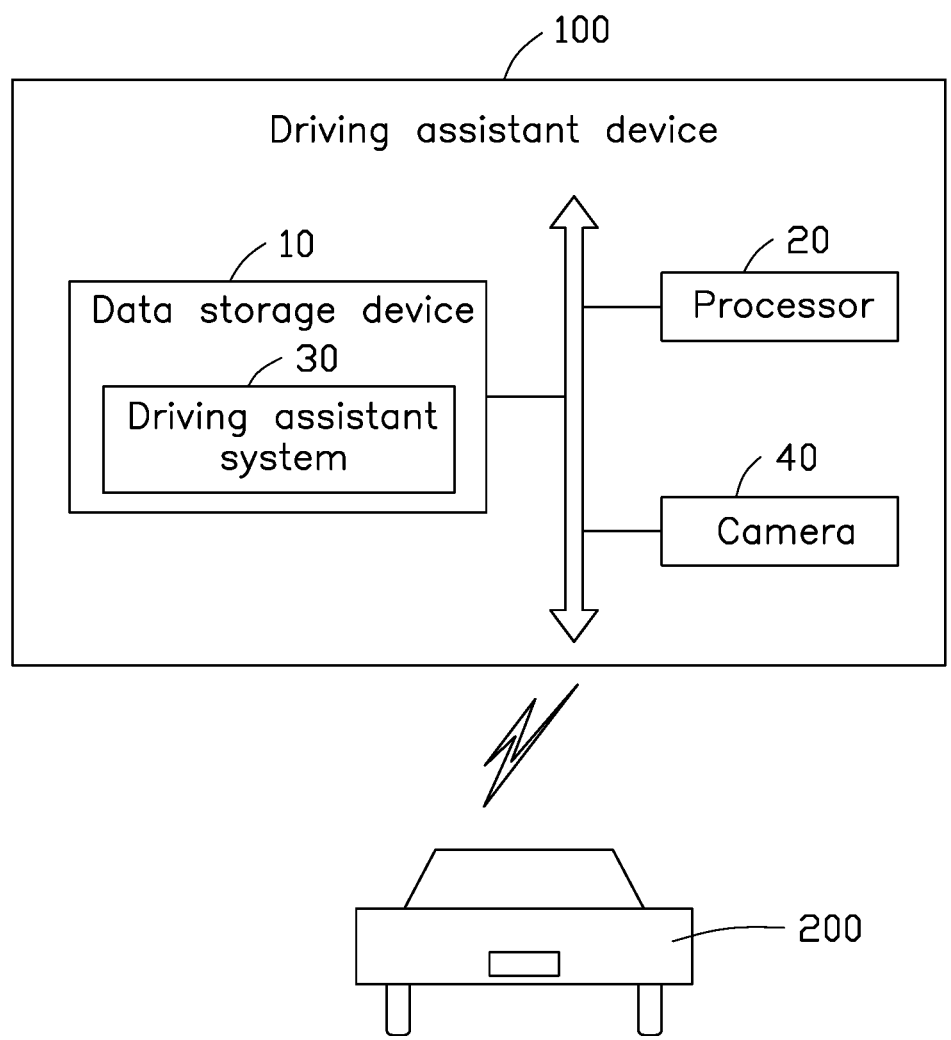
FIG. 1 is a block diagram of an embodiment of a device providing driving assistance.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure. It should be noted that references to "an" or "one" embodiment in this disclosure are not necessarily to the same embodiment, and such references mean "at least one".

Several definitions that apply throughout this disclosure will now be presented.

The connection can be such that the objects are permanently connected or releasably connected. The term "comprising," when utilized, means "including, but not necessarily limited to"; it specifically indicates open-ended inclusion or membership in the so-described combination, group, series, and the like.

FIG. 1 illustrates a driving assistant device 100 for providing assistance in driving a vehicle 200, in accordance with an embodiment. The device 100 can communicate in a wired or wireless manner with the vehicle 200. The vehicle 200 can be, but not limited to, a car, a truck.

The device 100 can comprise at least one data storage device 10, at least one processor 20, a driving assistant system 30, and at least one camera 40. The camera 40 can acquire images of the road in front of the vehicle 200. The driving assistant system 30 assists in the driving of the vehicle 200 by analyzing the images acquired by the camera 40.

In one embodiment, in order to acquire the images of the road in front of the vehicle 200, the camera 40 may be located on position that does not obstruct a line of sight of a driver of the vehicle 200. For example, the camera 40 may be located on an interior mirror, a front windshield, a front auto logo area, or a front license plate area. The camera 40 can capture images continuously. The camera 40 also can capture the images of road in front of the vehicle 200 at predetermined time intervals. The camera 40 can be a CCD camera, a CMOS camera, or an infrared camera.

In one embodiment, the camera 40 of the device 100 can be omitted, and the images of road in front of the vehicle 200 can be continuously captured by using a recorder installed on the vehicle 200.

Figure 2:
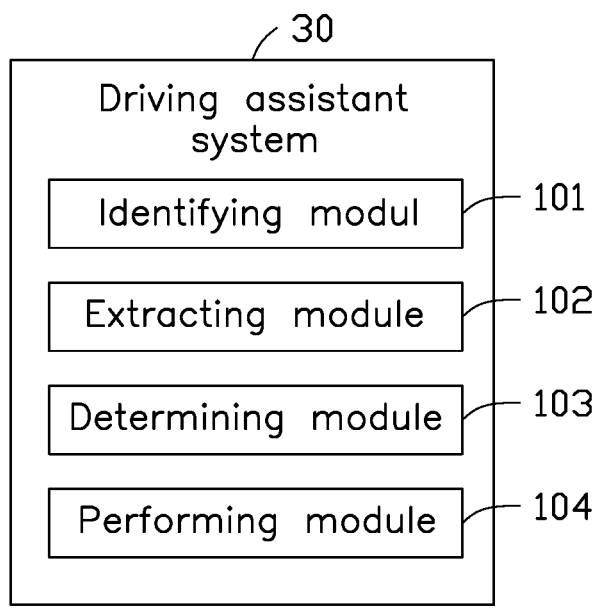
FIG. 2 is a block diagram of an embodiment of a system applied by the device of FIG. 1.

FIG. 2 illustrates that the driving assistant system 30 comprises a plurality of modules, such as an identifying module 101, an extracting module 102, a determining module 103, and a performing module 104. The modules 101-104 may comprise one or more software programs in the form of computerized codes stored in the data storage device 10. The computerized codes may include instructions that can be executed by the processor 20 to provide functions for the modules 101-104.

In one embodiment, the data storage device 10 can be inside the device 100, or can be a separate external memory card, such as an SM card (Smart Media Card), an SD card (Secure Digital Card), or the like. The data storage device 10 can include various types of non-transitory computer-readable storage mediums. For example, the data storage device 10 can be an internal storage system, such as a flash memory, a random access memory (RAM) for temporary storage of information, and/or a read-only memory (ROM) for permanent storage of information. The data storage device 10 can also be an external storage system, such as a hard disk, a storage card, or a data storage medium. The processor 20 can be a central processing unit (CPU), a microprocessor, or other data processor chip that performs functions of the driving assistant device 100.

The identifying module 101 can identify a traffic sign in the images captured by the camera 40.

In one embodiment, when the camera 40 captures the images of road in front of the vehicle 200, the processor 20 can communicate with the camera 40 to obtain the images. Then, the identifying module 101 can identify the images to determine whether the images comprise the traffic sign.

In one embodiment, the identifying module 101 can identify the images based on location information, color information, and morphological characteristics. The identification module 101 can perform a color threshold segmentation algorithm to identify color features of the traffic sign, and apply a shape discrimination algorithm to identify shape of the traffic sign. The identification module 101 can further combine the position information of the images to perform a correction in analysis.

In one embodiment, the identifying module 101 can pre-establish and train an image recognition model based on a plurality of sample images of traffic signs and a predetermined neural network algorithm. The identifying module 101 can identify the images according to the image recognition model to determine whether the images comprise the traffic sign.

For example, the identifying module 101 can pre-establish a machine learning model. The machine learning model can comprise an input layer, a plurality of hidden layers, and an output layer. The identifying module 101 further trains the machine learning model based on the sample images to obtain the image recognition model. The input layer of the machine learning model can be configured to receive multiple training features of the sample images and each hidden layer comprises multiple nodes (neurons of neural network). When the identifying module 101 trains the machine learning model based on the multiple training features, the identifying module 101 can adjust a weight value of each hidden layer through a back propagation (BP) algorithm. The output layer of the machine learning model can be configured to receive output signal of the last hidden layer.

In one embodiment, the identifying module 101 establishes and trains the image recognition model based on the training features through the method of dividing the training features into a training set and a verifying set. For example, eighty percent of the training features can be the training set and twenty percent of the training features can be the verifying set. The identifying module 101 establishes the machine learning model and trains the machine learning model based on the training set. The identifying module 101 applies the verifying set to verify a trained machine learning model and count a prediction accuracy of the trained machine learning model based on each verification result. The identifying module 101 determines whether the prediction accuracy of the trained machine learning model is less than a predetermined value. The identifying module 101 further sets the trained machine learning model as the image recognition model when the prediction accuracy of the trained machine learning model is not less than the predetermined value.

In one embodiment, when the prediction accuracy of the trained machine learning model is less than the predetermined value, the identifying module 101 adjusts parameters of the machine learning model, and retrains an adjusted machine learning model based on the training set. If a prediction accuracy of the adjusted machine learning model is greater than the predetermined value, the identifying module 101 sets the adjusted machine learning model as the image recognition model. Otherwise, the identifying module 101 repeats the adjustment and retraining of the parameters of the machine learning model according to the above steps until the prediction accuracy is greater than the predetermined value.

In one embodiment, the parameters of the machine learning model can comprise a total number of layers of the machine learning model and the number of neurons of each layer of the machine learning model. When the identifying module 101 adjusts the parameters of the machine learning model, the identifying module 101 can adjust the total number of layers of the machine learning model or the number of neurons of each layer of the machine learning model.

In one embodiment, when the vehicle 200 is stationary, the driving assistant device 100 can suspend the driving assistance function for the vehicle 200. The processor 20 can obtain a driving state of the vehicle 200 to determine whether the vehicle 200 is stationary, the identifying module 101 suspends the analysis of the images when the vehicle 200 is stationary.

The extracting module 102 can extract a first image frame captured at a first time t1 and a second image frame captured at a second time t2 when the images comprise the traffic sign. The second time is later than the first time.

In one embodiment, when the images are determined to comprise the traffic sign, the extracting module 102 extracts the first image frame captured at the first time t1 and the second image frame captured at the second time t2. Both of the first image frame and the second image frame comprise the traffic sign. The first time t1 and the second time t2 have a predetermined time difference, for example, two seconds.

In one embodiment, when the images are determined to comprise the traffic sign, the first time t1 may be set based on an actual identification and analysis need, for example, the image frame being just recognizable as containing the traffic sign is set as the first time t1.

The determining module 103 can determine whether a change or apparent change of the traffic sign from the first image frame to the second image frame conforms to a predetermined rule.

In one embodiment, the rule for change can be a size change rule. The determining module 103 determines whether a size change of the traffic sign from the first image frame to the second image frame conforms to the predetermined rule. The determining module 103 can obtain a size of the traffic sign (first size) in the first image frame and a size of the traffic sign (second size) in the second image frame. The determining module 103 further compares the first size and the second size to obtain the size change of the traffic sign to determine whether the size change of the traffic sign conforms to the predetermined rule.

In one embodiment, the predetermined rule can comprise the size or apparent size of the traffic sign increasing with a speed of the vehicle 200 in a predetermined ratio, or the size of the traffic sign increasing with the vehicle 200 driving forward.

Figure 3:
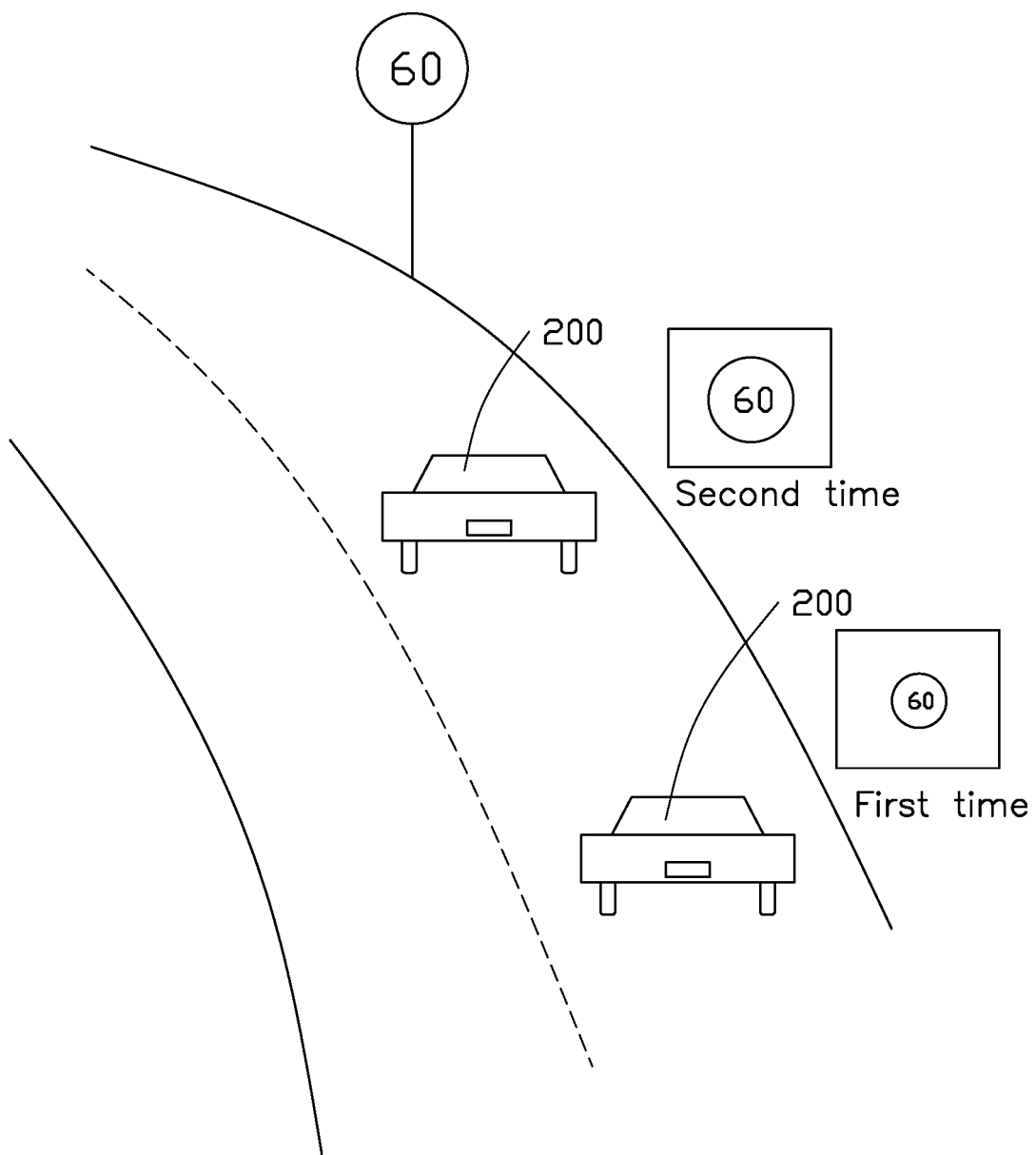
FIG. 3 is a diagram of apparent size changes of a traffic sign captured by a camera when a vehicle is driving forward.

FIG. 3 shows the size of the traffic sign increasing with the vehicle 200 driving forward. In FIG. 3, the first size of the traffic sign in the first image frame captured at time t1 is less than the second size at the second time t2.

When the change in size of the traffic sign from the first image frame to the second image frame conforms to the predetermined rule, the performing module 104 recognizes the traffic sign and triggers the vehicle 200 to perform an action according to a recognized result of the traffic sign.

In one embodiment, when the change in size of the traffic sign from the first image frame to the second image frame conforms to the predetermined rule, the traffic sign is deemed to be in the current road. The performing module 104 recognizes the traffic sign and triggers the vehicle 200 to perform the action.

For example, the traffic sign set in the current road is a speed limit sign (speed limit of 60 kph). When the performing module 104 recognizes the traffic sign as such but a speed of the vehicle 200 is greater than 60 kph, the performing module 104 triggers the vehicle 200 to perform a speed reduction operation to bring the speed of the vehicle 200 down to 60 kph. When the performing module 104 recognizes the traffic sign as such and the speed of the vehicle 200 is not greater than 60 kph, the performing module 104 does not trigger such action.

In one embodiment, when the change in size of the traffic sign from the first image frame to the second image frame conforms to the predetermined rule, the performing module 104 recognizes the traffic sign and triggers the vehicle 200 to perform the action according to the recognized traffic sign and a current driving state of the vehicle 200. For example, the current driving state of the vehicle 200 can be a running state, a stationary state, or a temporary stop state.

When the change in size of the traffic sign from the first image frame to the second image frame does not conform to the predetermined rule, this means that the traffic sign is not set in the current road, and the performing module 104 stops recognition of the traffic sign. For example, the traffic sign may be set in or on a road construction vehicle, and the size of the traffic sign in the image frame does not increase in the predetermined ratio with the speed of the vehicle 200 increasing. The determining module 103 determines that the change in size of the traffic sign does not conform to the predetermined rule, and the performing module 104 stops a recognition.

In one embodiment, when the performing module 104 triggers the vehicle 200 to perform the action, the performing module 104 further triggers the vehicle 200 to output a warning of the action to the driver of the vehicle 200. For example, the performing module 104 can trigger a display screen of the vehicle 200 to output the warning of the action.

In one embodiment, in order to improve the driving safety of the vehicle 200, the identifying module 101 further obtains road traffic information according to the images of the road. The road traffic information can comprise pavement condition information, status information of other vehicles, status information of pedestrians, and traffic congestion information. The performing module 104 further triggers the vehicle 200 to perform the action according to the recognized traffic sign and the road traffic information.

For example, the traffic sign set in the current road is a speed limit sign (speed limit of 40 kph). When the performing module 104 recognizes the traffic sign but the current road traffic is in a traffic congestion state, the performing module 104 does not trigger the vehicle 200 to accelerate.

Figure 4:
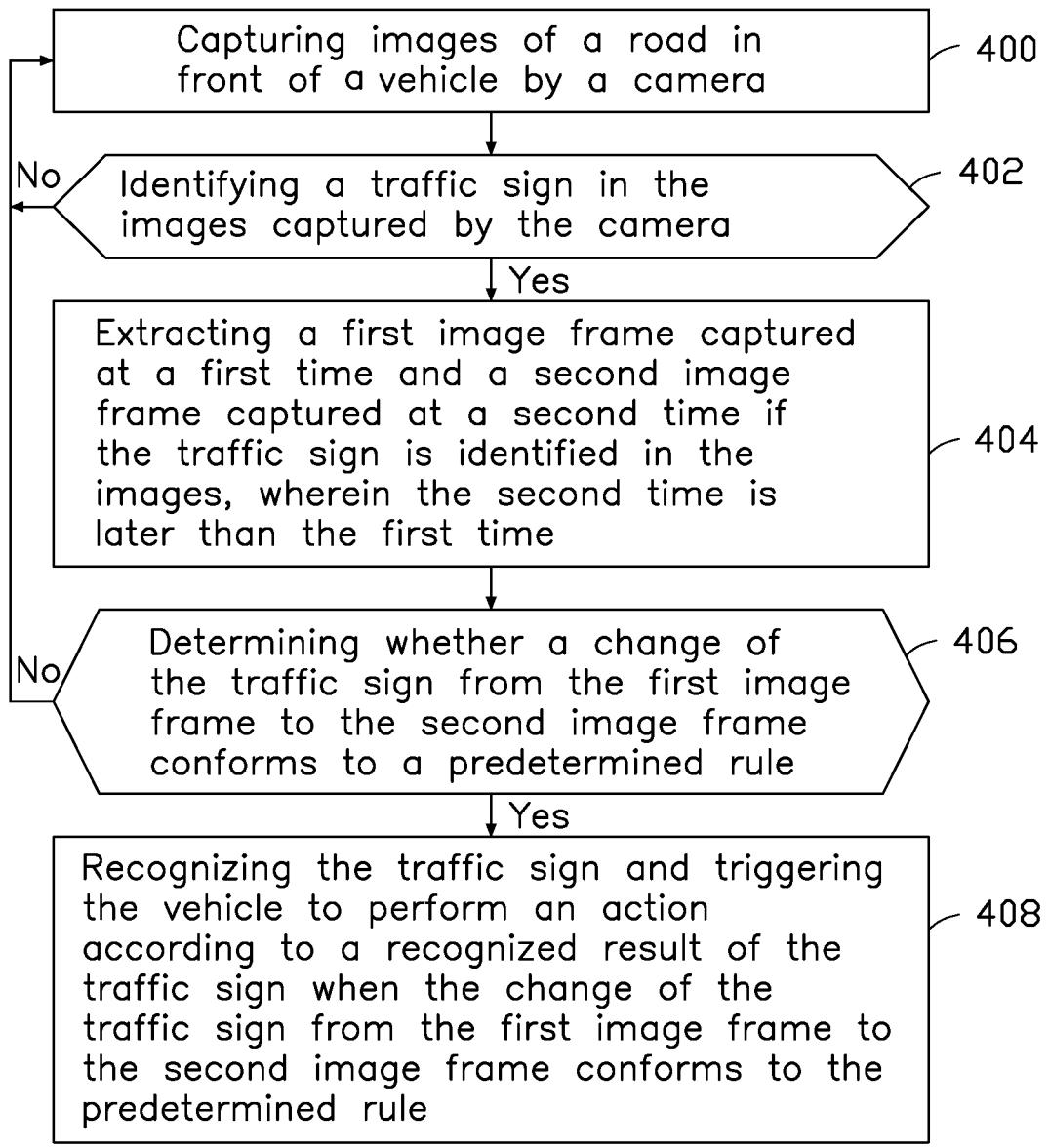
FIG. 4 is a flow diagram of a method for assistance in driving in one embodiment.

FIG. 4 illustrates one exemplary embodiment of a method for assistance in driving. The flowchart presents an exemplary embodiment of the method. The exemplary method is provided by way of example, as there are a variety of ways to carry out the method. The method described below can be carried out using the configurations illustrated in FIG. 2, for example, and various elements of these figures are referenced in explaining the example method. Each block shown in FIG. 4 may represent one or more processes, methods, or subroutines, carried out in the example method. Furthermore, the illustrated order of blocks is illustrative only and the order of the blocks can change. Additional blocks can be added or fewer blocks may be utilized, without departing from this disclosure. The example method can begin at block 400.

In block 400, capturing images of a road in front of the vehicle 200 by the camera 40.

In block 402, the identifying module 101 identifies a traffic sign in the images captured by the camera 40.

In block 404, when the traffic sign is identified in the images, the extracting module 102 extracts a first image frame captured at a first time t1 and a second image frame captured at a second time t2. The second time t2 is later than the first time t1. When the images do not comprise the traffic sign, the method can return to block 400.

In block 406, the determining module 103 determines whether a change of the traffic sign from the first image frame to the second image frame conforms to a predetermined rule.

In block 408, when the change of the traffic sign from the first image frame to the second image frame conforms to the predetermined rule, the performing module 104 recognizes the traffic sign and triggers the vehicle 200 to perform an action according to a recognized result of the traffic sign. When the change of the traffic sign from the first image frame to the second image frame does not conform to the predetermined rule, the performing module 104 stops recognition of the traffic sign, and the method can return to block 400.

The embodiments shown and described above are only examples. Many details known in the field are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A driving assistant method, the driving assistant method operated in a driving assistant device, the driving assistant device comprising a camera, a processor, and a storage, the driving assistant method comprising:
capturing, by the camera, images of a road in front of a vehicle;
identifying, by the processor, a traffic sign in the images captured by the camera;
extracting, by the processor, a first image frame captured at a first time and a second image frame captured at a second time if the traffic sign is identified in the images, wherein the second time is later than the first time;
determining, by the processor, whether a change of the traffic sign from the first image frame to the second image frame conforms to a predetermined rule; and
recognizing the traffic sign and triggering the vehicle to perform an action, by the processor, according to a recognized result of the traffic sign when the change of the traffic sign from the first image frame to the second image frame conforms to the predetermined rule.

2. The method of claim 1, wherein identifying the traffic sign in the images comprises:
identifying the traffic sign in the images based on location information, color information, and morphological characteristics of the images.

3. The method of claim 1, wherein identifying the traffic sign in the images comprises:
establishing and training an image recognition model based on a plurality of sample images of traffic signs and a predetermined neural network algorithm; and
identifying the traffic sign in the images according to the image recognition model.

4. The method of claim 1, wherein recognizing the traffic sign and triggering the vehicle to perform the action according to the recognized result of the traffic sign comprises:
recognizing the traffic sign and triggering the vehicle to perform the action according to the recognized result of the traffic sign and a current driving state of the vehicle.

5. The method of claim 1, further comprising:
stopping, by the processor, recognition of the traffic sign when the change of the traffic sign from the first image frame to the second image frame does not conform to the predetermined rule.

6. The method of claim 1, wherein the predetermined rule comprises: a size of the traffic sign increasing with a speed of the vehicle in a predetermined ratio, or the size of the traffic sign increasing with the vehicle driving forward.

7. The method of claim 1, further comprising:
outputting a performing notification of the action when the vehicle is triggered to perform the action according to the recognized result of the traffic sign.

8. The method of claim 1, wherein triggering the vehicle to perform the action according to the recognized result of the traffic sign comprises:
obtaining road traffic information according to the images of the road, wherein the road traffic information comprises pavement condition information, status information of other vehicles, status information of pedestrians, and traffic congestion information; and
triggering the vehicle to perform the action according to the recognized result of the traffic sign and the road traffic information.

9. The method of claim 1, further comprising:
obtaining a driving state of the vehicle to determine whether the vehicle is stationary; and
suspending identifying the images when the vehicle is stationary.

10. A driving assistant device comprising:
a camera capturing images of a road in front of a vehicle;
at least one processor;
a storage; and
one or more programs that are stored in the storage and executed by the at least one processor, the one or more programs comprising instructions for:
identifying a traffic sign in the images captured by the camera;
extracting a first image frame captured at a first time and a second image frame captured at a second time if the traffic sign is identified in the images, wherein the second time is later than the first time;
determining whether a change of the traffic sign from the first image frame to the second image frame conforms to a predetermined rule; and
recognizing the traffic sign and triggering the vehicle to perform an action according to a recognized result of the traffic sign when the change of the traffic sign from the first image frame to the second image frame conforms to the predetermined rule.

11. The driving assistant device of claim 10, wherein the instruction of identifying the traffic sign in the images comprises:
identifying the traffic sign in the images based on location information, color information, and morphological characteristics of the images.

12. The driving assistant device of claim 10, wherein the instruction of identifying the traffic sign in the images comprises:
establishing and training an image recognition model based on a plurality of sample images of traffic sign and a predetermined neural network algorithm; and
identifying the traffic sign in the images according to the image recognition model.

13. The driving assistant device of claim 10, wherein the instruction of recognizing the traffic sign and triggering the vehicle to perform the action according to the recognized result of the traffic sign comprises:
recognizing the traffic sign and triggering the vehicle to perform the action according to the recognized result of the traffic sign and a current driving state of the vehicle.

14. The driving assistant device of claim 10, wherein the one or more programs further comprise instructions for:
stopping recognition of the traffic sign when the change of the traffic sign from the first image frame to the second image frame does not conform to the predetermined rule.

15. The driving assistant device of claim 10, wherein the predetermined rule comprises: a size of the traffic sign increasing with a speed of the vehicle in a predetermined ratio, or the size of the traffic sign increasing with the vehicle driving forward.

16. The driving assistant device of claim 10, wherein the one or more programs further comprise instructions for:
outputting a performing notification of the action when the vehicle is triggered to perform the action according to the recognized result of the traffic sign.

17. The driving assistant device of claim 10, wherein the instruction of triggering the vehicle to perform the action according to the recognized result of the traffic sign comprises:
obtaining road traffic information according to the images of the road, wherein the road traffic information comprises pavement condition information, status information of other vehicles, status information of pedestrians, and traffic congestion information; and
triggering the vehicle to perform the action according to the recognized result of the traffic sign and the road traffic information.

18. The driving assistant device of claim 10, wherein the one or more programs further comprise instructions for:
obtaining a driving state of the vehicle to determine whether the vehicle is stationary; and
suspending identifying the images when the vehicle is stationary.

* * * * *